J. M. UPTON.
FOLDING CHICKEN OR POULTRY COOP.
APPLICATION FILED JUNE 29, 1916.
1,306,132.
Patented June 10, 1919.
2 SHEETS—SHEET 1.
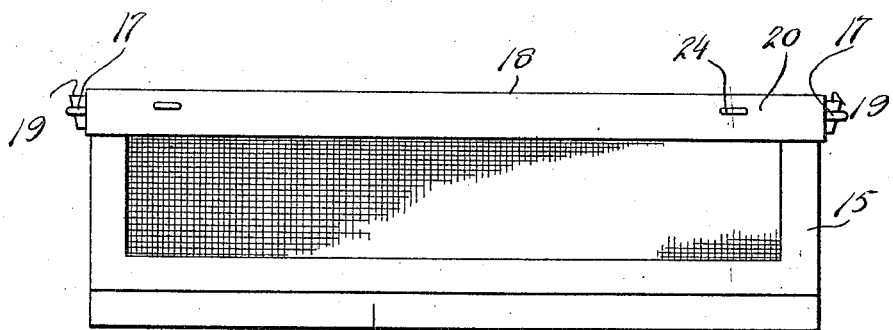
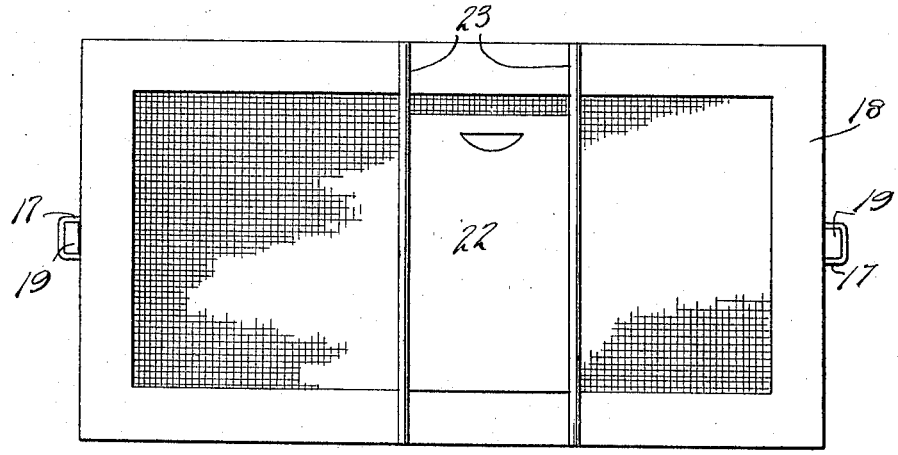
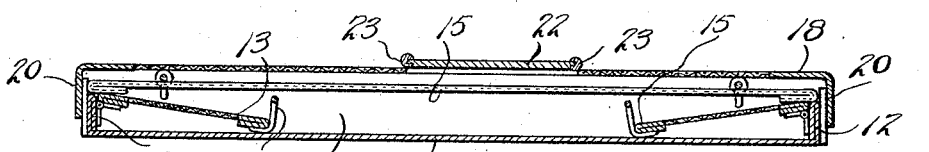
INVENTOR
James M. Upton.

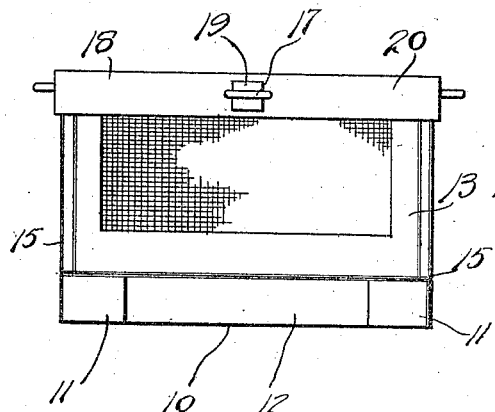
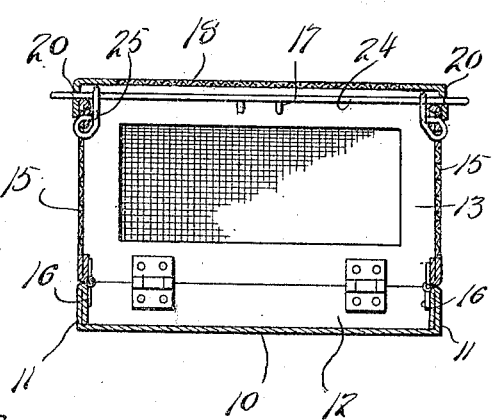
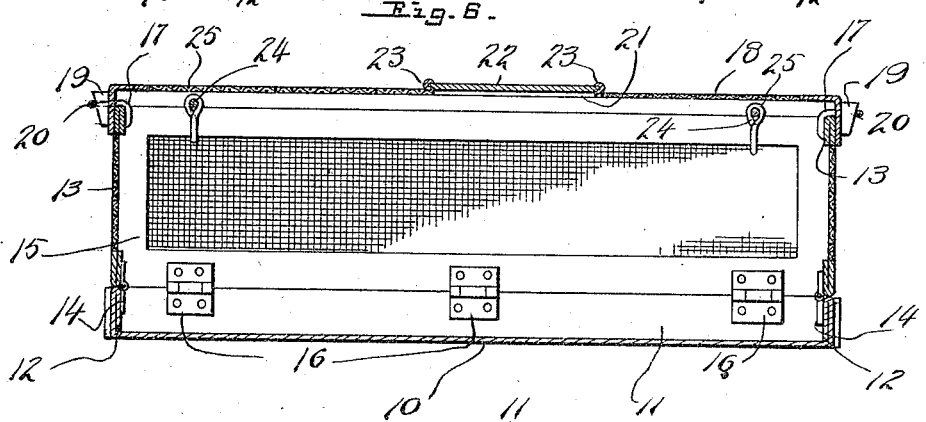
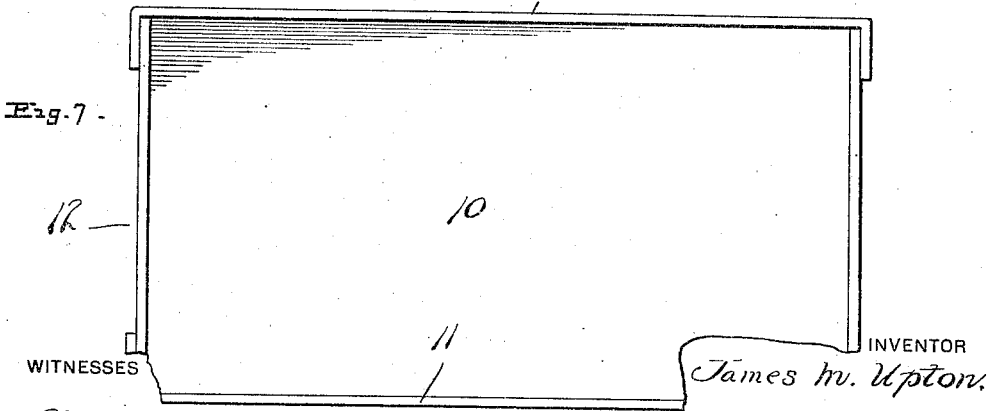

UNITED STATES PATENT OFFICE.

JAMES M. UPTON, OF SABINAL, TEXAS.

FOLDING CHICKEN OR POULTRY COOP.

1,306,132.  Specification of Letters Patent.  Patented June 10, 1919.

Application filed June 29, 1916. Serial No. 106,665.

*To all whom it may concern:*

Be it known that I, JAMES M. UPTON, a citizen of the United States, residing at Sabinal, in the county of Uvalde and State of Texas, have invented certain new and useful Improvements in Folding Chicken or Poultry Coops, of which the following is a specification.

This invention relates to certain new and useful improvements in folding chicken or poultry coops.

The primary object of this invention resides in the provision of a chicken or poultry coop which may be readily folded into compact form without the necessity of removing the cover, which will be of simple and cheap construction, as well as strongly durable and highly efficient in use.

Another object of the invention resides in the provision of a folding chicken or poultry coop in which the sides and ends may be arranged in such manner that the sides may be supported in upturned position by the end members and the cover, suitable means being also carried by the end members for engagement through the cover to support the end members in upright position.

A further object of the invention resides in the provision of a folding chicken or poultry coop of this character which will be of such construction that the side members may be readily folded upon the end members after the latter have been folded upon the bottom member without the necessity of disconnecting the side members from the top member or cover.

A still further object resides in the provision of a folding chicken coop of this character in which the body portion of the side members and the end members, as well as the cover may be formed of wire mesh or the like and a slide door provided for said cover.

With these general objects in view and others that will appear as the nature of the invention is better understood, the same consists in the novel combination and arrangement of parts hereinafter more fully described, illustrated in the accompanying drawings and pointed out in the appended claim.

In the drawings forming a part of this application and in which like-designating characters refer to corresponding parts throughout the several views:—

Figure 1 is a side elevation of the device in set-up position.

Fig. 2 is a top plan view thereof.

Fig. 3 is a longitudinal vertical section of the device in its folded position.

Fig. 4 is an end elevation of the complete device in set-up position.

Fig. 5 is a transverse vertical section through the device in set-up position.

Fig. 6 is a vertical longitudinal section through the device in set-up position, and Fig. 7 is a plan view of the bottom member.

Referring more in detail to the drawings, 10 designates the bottom member which is provided with upstanding side flanges 11 and upstanding end flanges 12, said flanges 11 and 12 being bent back upon themselves to increase the strength of the device. It will also be noted by referring to the drawings, that the ends of the side flanges 11 are extended around the corners of the end flanges 12 to prevent outward movement of the latter.

The end members 13 are hinged upon the end flanges by suitable hinges 14 and may be readily moved to upright or vertical position as shown in Figs. 1, 4, 5, and 6 or removed to folded position as illustrated in Fig. 3. When in vertical upright position, however, the end members 13 will rest upon the upper edges of the end members 12, as clearly shown in Fig. 6.

Connected to the side flanges 11 are the side members 15, suitable hinges 16 being employed to form the connection, as clearly shown in Figs. 5 and 6. When the side members 15 are in upright or horizontal position, the lower edges of the same will rest upon the side flanges 11 and the upper edges of said side members 15 will be in the same horizontal plane as the upper edges of the extended end members 13. The side members 15 may be readily swung to horizontal or upright position as shown in Figs. 5 and 6 or moved upon the hinges 16 to folded position upon the folded end members 13, as shown in Fig. 3. It will also be understood that when the end members 13 and side members 15 are in upright or extended position, the end members 13 are positioned inwardly of the side members 15, thereby preventing said side members 15 from swinging inwardly.

In order to secure the end members 13 in upright or extended position, I have provided staple members 17 which are carried by the upper edges of the end members 13, and project horizontally through the end flanges of the cover 18. Cam locking blocks 19 are extended through the projecting central or looped portion of the staple members 17, as clearly shown in Figs. 1, 2, 4 and 6.

It will be seen by referring to the drawings, that the end members 13, side members 15 and cover 18 are composed of a frame including a body portion formed of wire mesh or similar material, thereby providing a folding chicken coop, of extremely simple and light construction, and one which will be thoroughly ventilated.

The cover 18 is provided with a central door opening 21 which may be closed by the sliding cover or door 22 positioned transversely of the same and having its side edges engaged in the guide flanges 23 secured transversely of the cover 18 to either side of the door opening 21. Transverse rods 24 are carried by the cover 18 and have twisted links 25 slidably engaged upon the same, said twisted links having portions engaged through the upper frame members of the side members 15 as clearly shown in Fig. 5 of the drawings. It will therefore be seen that the cover 18 is connected with the upper edges of both of the side members 15 when the device is in set-up or folded form, the twisted links 25 sliding freely upon the rods 24 during the movement of said side members 15 to either set-up or folded position. When the device is in folded position, the side and end flanges of the cover 18 engage over the side and end flanges of the bottom member 10, thereby thoroughly inclosing and protecting the folded end members 13 and side members 15.

While I have shown and described the preferred embodiment of my invention, minor changes may be made therein without departing from the spirit and scope of the invention as set forth in the claim.

What is claimed as new is:—

A foldable crate including a base, side and end members hingedly connected to said base at their lower edges, a cover provided with depending side and end flanges surrounding the upper edges of said side and end members, fastening members engageable with said end members and cover to retain said end members in an upright position, a plurality of twisted links loosely secured to the upper edge of one of said side members, and a plurality of transverse rods extending through said links and through the depending side flanges of the cover, said rods engaging the upper edge of the side members, and said fastening members being adjustable to increase the pressure of the rods upon said side members.

In testimony whereof I affix my signature in presence of two witnesses.

JAMES M. UPTON.

Witnesses:
CLAUDE E. FREEMAN,
ABNER GRIFFITH.

Copies of this patent may be obtained for five cents each, by addressing the "Commissioner of Patents, Washington, D. C."